United States Patent [19]
Yamamoto

[11] Patent Number: 5,614,673
[45] Date of Patent: Mar. 25, 1997

[54] ACCELERATION SENSING DEVICE

[75] Inventor: Masahiro Yamamoto, Itami, Japan

[73] Assignee: Mitsubishi Denki Kabushiki Kaisha, Tokyo, Japan

[21] Appl. No.: 552,073

[22] Filed: Nov. 2, 1995

[30] Foreign Application Priority Data

Nov. 21, 1994 [JP] Japan ................................ 6-286841

[51] Int. Cl.[6] ...................................................... G01P 15/12
[52] U.S. Cl. ....................................... 73/514.33; 73/514.36
[58] Field of Search ........................... 280/735; 340/650, 340/438; 73/1 D, 514.16, 514.21, 514.23, 514.33, 514.36, 514.32; 338/2

[56] References Cited

U.S. PATENT DOCUMENTS

| 5,018,763 | 5/1991 | Okano | 340/438 |
| 5,410,915 | 5/1995 | Yamamoto | 73/514.32 |
| 5,415,044 | 5/1995 | Yamamoto | 73/514.33 |
| 5,460,044 | 10/1995 | Yamamoto | 73/514.16 |

FOREIGN PATENT DOCUMENTS

| 5119060 | 5/1993 | Japan . |
| 5249141 | 9/1993 | Japan . |
| 627137 | 2/1994 | Japan . |

*Primary Examiner*—Christine K. Oda
*Attorney, Agent, or Firm*—Leydig, Voit & Mayer

[57] ABSTRACT

An acceleration sensing device having a cantilevered acceleration sensing beam mounted at one of its ends on a base mounted on a package substrate. Strain caused by the movement of a weight disposed at a free end of the acceleration sensing beam is detected with a bridge circuit. When the base separates from the package substrate, an abnormal state sensing electrode of the weight comes into electrical contact with the package substrate, which is a ground terminal, so that an output from a differential amplifier of the bridge circuit is fixed to a low (or high) level, warning of the abnormal state.

4 Claims, 3 Drawing Sheets

ACCELERATION SENSING DEVICE

BACKGROUND OF THE INVENTION

1. Field of the Invention

The present invention relates to an acceleration sensing device and, more particularly, to an acceleration sensing device for use in an automotive antilock brake system, an air bag system and the like.

2. Description of the Related Art

FIG. 4 is a cross sectional view showing a structure of a known acceleration sensing device. The known acceleration sensing device is a strain gauge type acceleration sensing device making use of the piezo resistance effect. As illustrated in FIG. 4, a base 5 composed of silicon is disposed on a package substrate 7a which is made of conductive material such as Kovar. Also, an acceleration sensing beam 3 composed of silicon is disposed on the base 5 by being fixed thereto at one end of the sensing beam as a cantilever. A weight 6 is fixed to the free end of the acceleration sensing beam 3 and, further, a bridge circuit 1A (See FIG. 5) composed of four gauge resistors 1 is disposed at a position on the acceleration sensing beam 3. The bridge circuit serves as sensor means for detecting the strain of the acceleration sensing beam 3 resulting from the swinging of the weight 6 caused by the acceleration of a body such as an automobile or the like on which the acceleration sensing device is mounted. Operation of the bridge circuit 1A will be described subsequently. The acceleration sensing beam 3 has a thinner portion on which the bridge circuit 1A is disposed and which serves as a diaphragm 4, so that the sensitivity of the bridge circuit 1A for sensing strain is improved. Although the diaphragm 4 may be formed by locally thinning the acceleration sensing beam 3, a diaphragm may be formed separately and joined to the acceleration sensing beam 3.

Further, a connection 2a of the gauge resistors 1 and a wiring conductor 2b are disposed on the acceleration sensing beam 3. The connection 2a and the wiring conductor 2b constitute a wiring means 2. A lead pin 8 extends through the package substrate 7a. The lead pin 8 serves as an output means for outputting electrical signal. The lead pin 8 is electrically insulated from the package substrate 7a by an insulating member such as a glass member 20 and insulating resin. Further, a lead pin 9 is formed integrally with the package substrate 7a so the package substrate 7a is a ground terminal for the bridge circuit 1A. The lead pins 8 and 9 and the wiring means 2 are connected to each other through wires 10 so that an electrical signal indicating a strain detected by the bridge circuit 1A is transmitted to the lead pins 8 and 9 through the wiring means 2 and the wires 10. Further, a cover 7b composed of a metal such as iron or the like is fixedly attached to the package substrate 7a in order to protect the base 5, acceleration sensing beam 3, weight 6 and so on. The package substrate 7a and cover 7b constitute an outer package or an armor 7.

FIG. 5 is a circuit diagram showing an arrangement of the acceleration sensing device of FIG. 4. The bridge circuit 1A comprises of the four gauge resistors 1 as mentioned above. The positive output of the bridge circuit 1A is connected to the positive input of a differential amplifier 11 which is disposed outside of the outer package 7. Also, the negative output of the bridge circuit 1A is connected to the negative input. Operation will be briefly described as follows. When the weight 6 fixed to the acceleration sensing beam 3 moves in response to acceleration of the body which it is attached such as the automobile or the like, a strain is caused in the diaphragm 4. When the gauge resistors 1 receive the strain, their resistance value changes due to the piezo resistance effect and the balance of the bridge circuit 1A is destroyed. When a voltage is applied to the bridge circuit 1A at that time, the amount of imbalance can be determined by detecting the difference in voltage. Therefore, acceleration can be measured from a signal output from the differential amplifier 11 into which the positive output and the negative output from the bridge circuit 1A is input.

The known acceleration sensing device arranged as described above has a problem in that although the base 5 sometimes happens to separate from the package substrate 7a due to vibration of the body to which it is attached such as an automobile, as shown in FIG. 6, if the wires 10 are not severed at that the time, a voltage signal from the bridge circuit 1A is input to the differential amplifier 11 through the lead pin 8 and a signal is output from the differential amplifier 11 based on the voltage signal. Thus, acceleration is erroneously measured without anyone knowing that an abnormal state exists with the base 5 separated from the package substrate 7a.

SUMMARY OF THE INVENTION

Accordingly, one object of the present invention is to provide an acceleration sensing device free from the above-discussed problems of the known acceleration sensing device.

Another object of the present invention is to provide an acceleration sensing device capable of detecting an abnormal state exists when the base 5 has separated from the package substrate 7a to prevent erroneous acceleration detection and improve the reliability of acceleration measurement.

With the above objects in view, an acceleration sensing device of the present invention comprises: a conductive package substrate; a base disposed on the package substrate; an acceleration sensing beam attached to the base and having a free end; a weight disposed at the free end of the acceleration sensing beam; sensor means disposed on the acceleration sensing beam for detecting the strain of the acceleration sensing beam; output means connected to the sensor means for outputting a detection signal from the sensor means to the outside; a ground terminal electrically connected to the package substrate; abnormal-state sensing means electrically connected between the sensor means and the output means, for electrically contacting the package substrate for connecting the ground terminal to the sensor means and the output means when the base has separated from the package substrate.

The abnormal state sensing means may comprise an electrode formed on the surface of the weight by, for example, nickel plating. Alternatively, the abnormal state sensing means and the weight may be integrally formed of a conductor having a high electrical conductivity.

BRIEF DESCRIPTION OF THE DRAWINGS

The present invention will become readily apparent from the following detailed description of the preferred embodiments of the present invention taken in conjunction with the accompanying drawings, in which.

DESCRIPTION OF PREFERRED EMBODIMENTS

Embodiment 1

Figure 1:
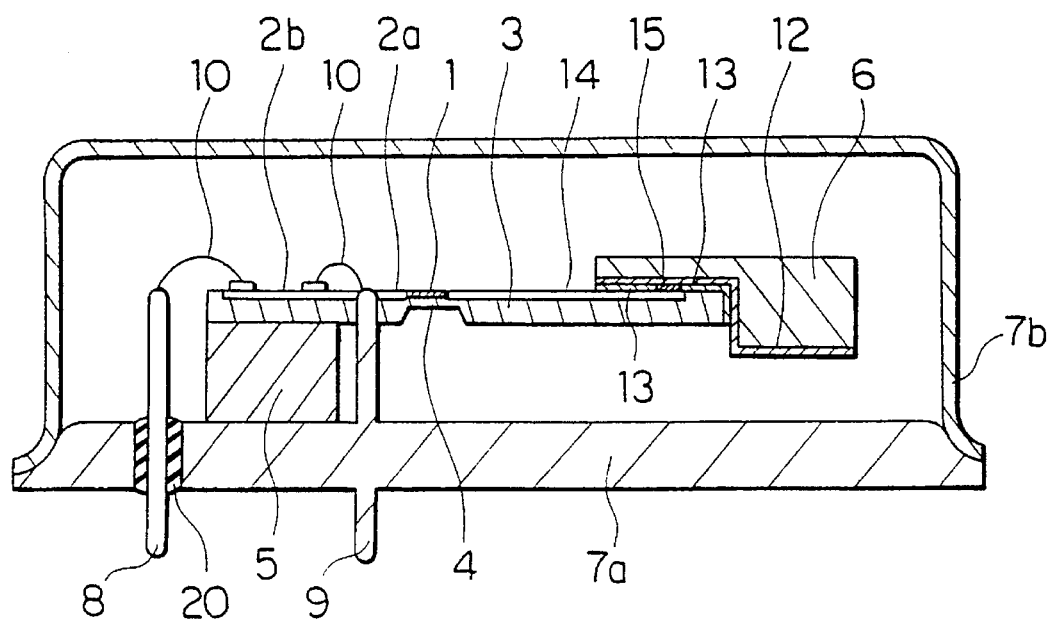
FIG. 1 is a cross sectional view illustrating a first embodiment of an acceleration sensing device according to the present invention.
Figure 2:
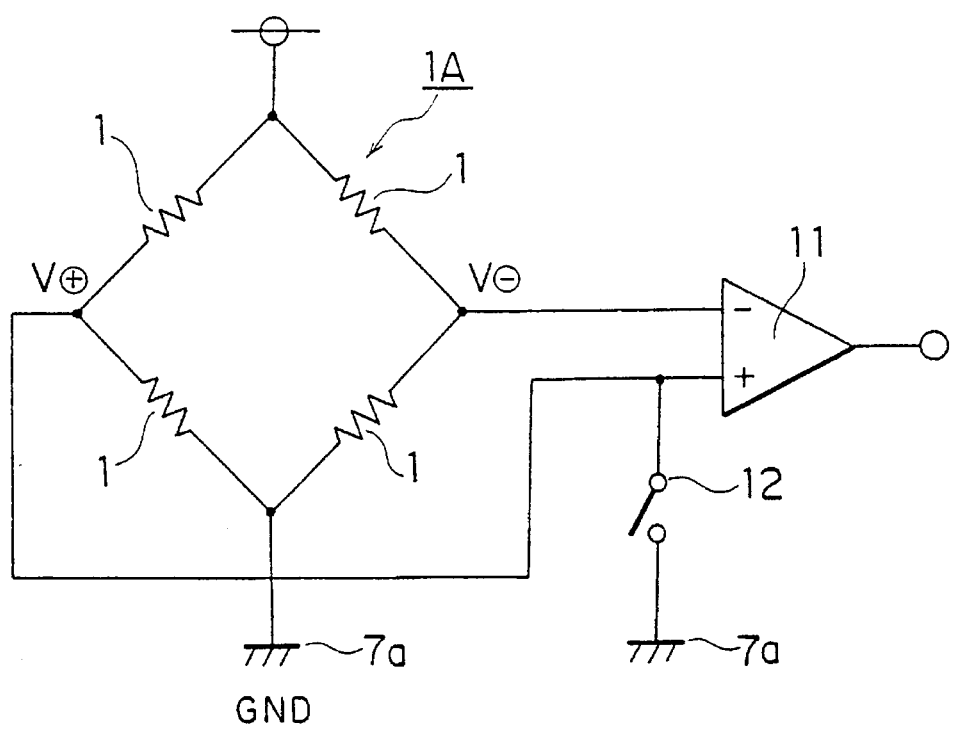
FIG. 2 is a circuit diagram showing an arrangement of the acceleration sensing device of FIG. 1.
Figure 4:
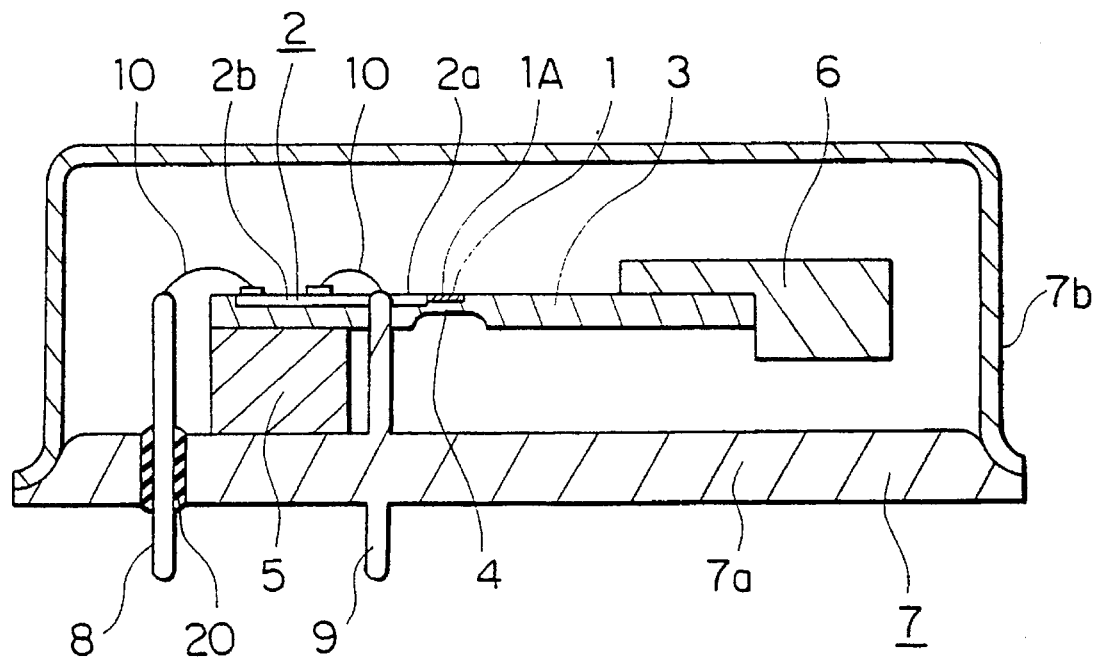
FIG. 4 is a cross sectional view showing a structure of an unpublished acceleration sensing device known to the inventor.
Figure 5:
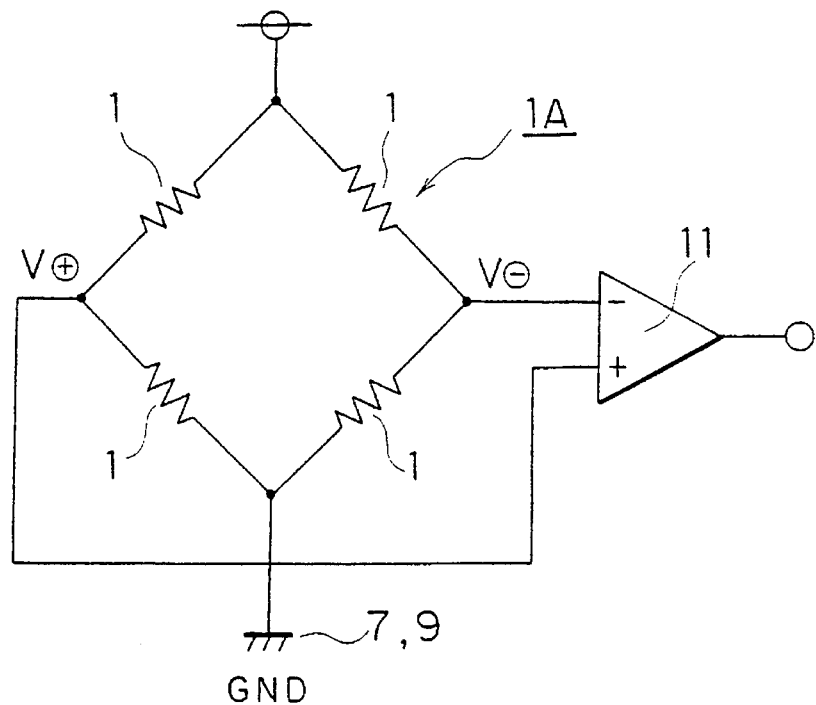
FIG. 5 is a circuit diagram showing an arrangement of the known acceleration sensing device of FIG. 4.

Embodiments of the present invention will be described below. Since the basic arrangement of the first embodiment of the present invention is the same as that of the above-mentioned known acceleration sensing device shown in FIG. 4, the same numerals as used in FIG. 4 are used to denote the same parts and these description of the parts is omitted here. As shown in FIG. 1, the first embodiment has an abnormal-state sensing electrode 12 covering a lower surface of a weight 6 and formed by nickel plating or the like. The weight 6 including the abnormal-state sensing electrode 12 is adhered to an acceleration sensing beam 3 with an electrically conductive resin 13 such as a silver paste or the like. Further, the acceleration sensing beam 3 includes a diffusion wiring 14, which is connected to a bridge circuit 1A comprising gauge resistors 1 that extends to the adhered portion of the weight 6, connecting the bridge circuit 1A to the abnormal-state sensing electrode 12. The diffusion wiring 14 is connected to the positive output of the bridge circuit 1A. Although the diffusion wiring 14 is connected to the abnormal-state sensing electrode 12 through the electrically conductive resin 13, if necessary, they may be connected through an aluminium electrode 15 formed by vapor deposition or the like. As a method of forming the aluminium electrode 15, a $SiO_2$ film is formed on the acceleration sensing beam 3 by thermal oxidation, a contact hole is formed in a region where the aluminium electrode is to be formed by etching and aluminium is deposited in the contact hole by vapor deposition.

Figure 6:
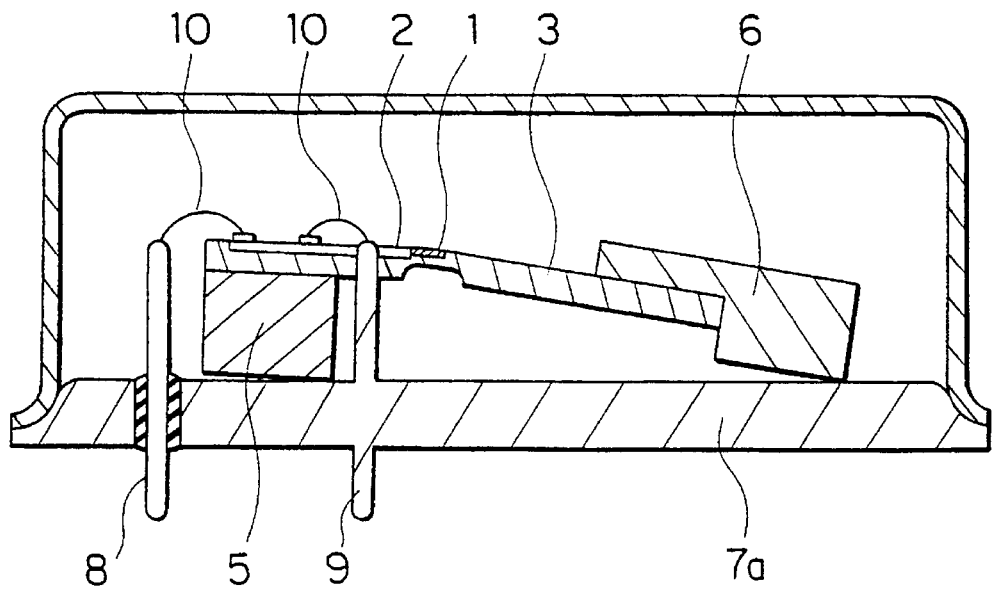
FIG. 6 is a cross sectional view showing the acceleration sensing device of FIG. 4 with the base separated from a package substrate thereof.

In the first embodiment arranged as described above, when the base 5 separates from a package substrate 7a as shown in FIG. 6, the weight 6 comes into contact with the package substrate 7a. The abnormal-state sensing electrode 12 therefore comes into electrical contact with the package substrate 7a and the abnormal-state sensing electrode 12, which is connected to the positive output potential of the bridge circuit 1A, comes into contact with the package substrate 7a which is connected to a GND potential. Therefore, the positive input of the differential amplifier 11 is grounded and its output is fixed to a low level. Consequently, an abnormal state such as the separation of the base 5 from the package substrate 7a can be detected immediately and the measurement of an erroneous acceleration can be prevented. Thus, the abnormal-state sensing electrode 12 serves as abnormal-state sensing means disposed on the weight 6 opposite the package substrate 7a and electrically connected between the bridge circuit 1A and the lead pin 8, serving as output means, for electrically contacting the package substrate 7a to connect the ground terminal of the bridge circuit 1A to the lead pin 8 when the base 5 separates from the package substrate 7a.

Although the first embodiment illustrate a case in which the positive output of the bridge circuit 1A is connected to the diffusion wiring 14, the connection is not limited to this arrangement. The negative output of the bridge circuit 1A may be connected to the diffusion wiring 14. In that case, when an abnormal state i.e., the base 5 separates from the package substrate 7a, since an output from the differential amplifier 11 is fixed to a high level, the abnormal state can be detected immediately as in the above-described case.

As described above, when the base 5 separates from the package substrate 7a in the acceleration sensing device of the present invention, since an output from the differential amplifier 11 is fixed to the low level or high level even if wires 10 are not severed, an abnormal state can be easily detected and the reliability of detection can be improved.

Note, that although in the description of the first embodiment the strain gauge type acceleration sensing device makes use of the piezo resistance effect, the embodiment is not limited thereto but the present invention is applicable to any strain type acceleration sensing device so long as it has an acceleration sensing beam and a weight.

Embodiment 2

Figure 3:
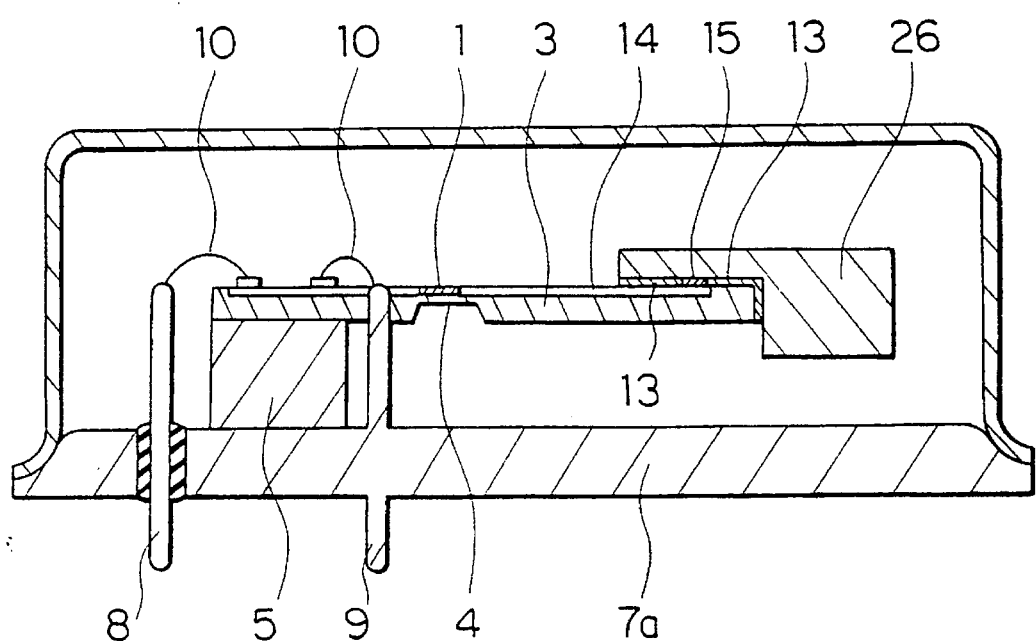
FIG. 3 is a cross sectional view illustrating a second embodiment of an acceleration sensing device according to the present invention.

FIG. 3 shows a structure of a second embodiment of the present invention. Although the aforesaid first embodiment includes the abnormal state sensing electrode 12 on the surface of the second weight 6, the embodiment is provided with a weight 26 formed of a conductor having high electrical conductivity such as copper, silver, SPC or the like without the provision of the abnormal-state sensing electrode 12.

Since the second embodiment is provided with the weight 26 made of the conductor having high electrical conductivity, the abnormal-state sensing electrode 12 is not needed. An advantage similar to that of the aforesaid first embodiment can be obtained, the manufacturing process can be simplified, and the acceleration sensing device can be made at a low cost.

As has been described above, according to the present invention, since the abnormal state sensing electrode is disposed on the surface of the weight, opposite to the package substrate, at the free end of the acceleration sensing beam, when the base separates from the package substrate and the weight comes into contact with package substrate, the abnormal state sensing electrode is connected to the ground terminal of the package substrate and a detection signal output from the output means is fixed to a high level or a low level. Thus, the abnormal state can be easily detected an erroneous acceleration measurement is prevented.

Also, if the abnormal state sensing electrode is integral with the weight, an advantage similar to that described above can be obtained, the manufacturing process can be simplified, and the acceleration sensing device can be made at a low cost.

What is claimed is:

1. An acceleration sensing device comprising:

an electrically conductive package substrate;

a base disposed on said package substrate;

an acceleration sensing beam attached to said base at one end of said acceleration sensing beam, said acceleration sensing beam also having a free end;

a weight disposed on said free end of said acceleration sensing beam;

sensor means disposed on said acceleration sensing beam for detecting strain of said acceleration sensing beam;

output means connected to said sensor means for outputting a detection signal from said sensor means;

a ground terminal electrically connected to said package substrate; and abnormal-state sensing means at said weight opposite said package substrate and electrically connected between said sensor means and said output means electrically contacting said package substrate for connecting said ground terminal to said sensor means and to said output means when said base separates from said package substrate.

2. The acceleration sensing device according to claim 1, wherein said abnormal-state sensing means comprises an electrode disposed on a surface of said weight.

3. The acceleration sensing device according to claim 2, wherein said electrode is a nickel plating.

4. An acceleration sensing device comprising:

an electrically conductive package substrate;

a base disposed on said package substrate;

an acceleration sensing beam attached to said base at one end of said acceleration sensing beam, said acceleration sensing beam also having a free end;

sensor means disposed on said acceleration sensing beam for detecting strain of said acceleration sensing beam;

output means connected to said sensor means for outputting a detection signal from said sensor means;

a ground terminal electrically connected to said package substrate; and abnormal-state sensing means comprising, integrally, an electrical conductor and an electrically conducting weight, said electrically conducting weight being disposed on said free end of said acceleration sensing beam, said abnormal-state sensing means electrically contacting said package substrate and connecting said ground terminal to said sensor means and to said output means when said base separates from said package substrate.

* * * * *